Patented May 2, 1950

2,506,224

UNITED STATES PATENT OFFICE 2,506,224

CELLULOSE DERIVATIVE TEXTILE FIBERS DYED WITH DERIVATIVES OF 1-AMINO-2-NITRO-BENZENE-4-SULFAMIDE

Georges Kopp, Mont Saint-Aignan, and René Eugène Marcel Gangneux, Rouen, France, assignors to Manufactures de Produits Chimiques du Nord Etablissements Kuhlmann, Paris, France, a corporation of France No Drawing. Application April 26, 1945, Serial No. 590,504. In France August 28, 1941

Section 1, Public Law 690, August 8, 1946
Patent expires August 28, 1961

2 Claims. (Cl. 8—57)

This invention relates to the colouring of rayon silks basically composed of cellulose esters or ethers and of the organic solvents, fatty matters and varnishes.

It is well known that rayon silks basically composed of cellulose acetate can be dyed with nitrated dyestuffs containing neither the group $SO_3H$ nor the group $CO_2H$. These products, which are mostly substituted dinitrodiphenylamines generally possess a good fastness to light when applied alone as well as in a mixture, for instance with blues derived from anthraquinone. They show, however, drawbacks which diminish their possibilities of use, more particularly for printing purposes. Dinitrated derivatives, in particular, attack the acetate rayon silk during the printing operation and thus diminish the mechanical strength of the fibre. On the other hand they are rather difficult to disperse and the printings, more particularly on mat rayon silks, show picots. Since their physical properties are not favourable to their dispersion in the dyeing baths, the quality and the yield of the dyeings are most irregular. Finally, they sublimate, especially during vaporization.

Now, according to the present invention, it has been found that most of the said drawbacks are avoided when using, for dyeing or printing of rayon silks basically composed of cellulose esters or ethers, nitrated dyestuffs answering the following general formula:

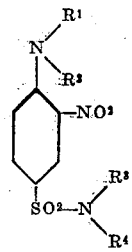

in which $R^1$, $R^2$, $R^3$ and $R^4$ represent either hydrogen or alkyl, oxyalkyl, cycloalkyl or aralkyl radicals which can be eventually substituted, identical or different, under the condition that at least one of the radicals $R^1$, $R^2$, $R^3$ and $R^4$ is not hydrogen.

A certain number of products answering the said formula have already been described in the literature, but their use for dyeing cellulose acetate rayon silks has never been suggested. In a general manner, such products may be prepared by condensation of 1-halogen-2-nitrobenzene-4-sulphamides which are eventually substituted to nitrogen, or of 1-chloro-2-nitrobenzene-4-sulphochloride, with primary or secondary amines or with ammonia. They offer the following advantages:

(1) They can very readily be dispersed, thus giving emulsions showing by transparency the aspect of true solutions. Their dispersion is favoured by the fact that they can be dissolved by alkalies in the presence of suitable dispersing agents, according to the methods which are described in the French Patent No. 858,386, filed on April 24, 1939.

(2) The presence of the fraction $SO^2N$ confers them an excellent affinity for acetate rayon silk and a perfect resistance against sublimation.

(3) When dyed or printed in a mixture with blue dyestuffs, they yield green shades which are faster to light than those which can be obtained by means of the hitherto known dyestuffs.

It is also known that certain of the products answering the above given general formula are soluble in organic solvents, but their use for colouring plastic matters, fats and varnishes has never been mentioned hitherto. Now, it has been found, according to the invention, that they allow the dyeing, with excellent yield, of cellulosic varnishes and fatty matters, in bright colours which are particularly fast to light and sublimation.

The following are non-limitative examples of forms of execution of the present invention.

In these examples, the parts by volume are taken so that in the case of water one part by volume is equal to one part by weight.

Example 1

236.5 parts by weight of 1-chloro-2-nitrobenzene-4-sulphamide are introduced, in small portions, into a solution, heated up to 100° C., of 300 parts by weight of cyclohexylamine in 300 parts by volume of water. The condensation is very rapid and the product of the reaction separates in the form of oil. Hydrochloric acid is added for removing the excess of cyclohexylamine, then the whole mass is allowed to cool and the dyestuff is filtered and crystallizes on cooling. After being twice re-crystallized in acetic acid, it melts at 159° C. This dyestuff which has as formula:

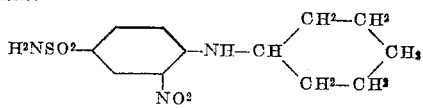

dyes the acetate rayon silks in greenish yellow shades which are fast to light.

Example 2

256 parts by weight of 1-chloro-2-nitrobenzene-4-sulphochloride are introduced in small portions into a solution, heated up to 100° C., of 600 parts by weight of cyclohexylamine in 600 parts by volume of water. The reaction is very rapid. The obtained product is freed from the cyclohexylamine in excess by treatment with diluted hydrochloric acid. When re-crystallized from benzene, it melts at 166–167° C. Its constitution is as follows:

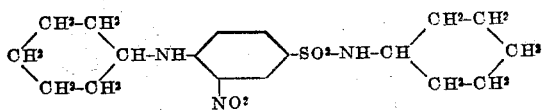

It dyes the fatty matters, solvents and varnishes in very green yellow shades which are fast to light. Its perfect resistance to sublimation renders it very interesting for the production of greenish yellow printing inks.

Example 3

The cyclohexylamine is replaced, in Example 1, by 180 parts in weight of ethanolamine which are heated up to 120° C. in an autoclave during two hours. When re-crystallized in water, the so obtained product melts at 139/140° C. and has the following constitution:

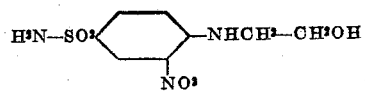

It dyes the acetate rayon silks in very green yellow which is fast to light. Its affinity for this fibre is excellent, even at temperatures nearing 50° C. When mixed with a blue derived from amino-anthraquinone, it yields greens which are fast to light.

Example 4

A dyeing bath is prepared by means of one part by weight of 1-phenyl-amino-2-nitrobenzene-4-sulphanilide:

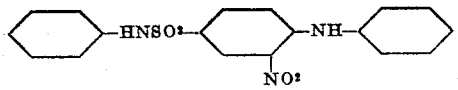

dispersed, for instance, according to one of the methods described in the above mentioned French Patent No. 858,386, of 20 parts by weight of yellow soap and of 4,000 parts by volume of water. The whole mass is heated up to 40° C. and 100 parts by weight of acetate rayon silk are introduced. The temperature is brought to 85° C. in half an hour and the dyeing is continued during one hour and a half at this temperature. The fibre is thoroughly rinsed, wrung and dried. The fibre is dyed in a yellow which is very fast to light.

Example 5

1 part by weight of 1-phenyl-amino-2-nitrobenzene-4-sulphamide

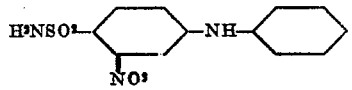

is dissolved in 100 parts by volume of nitrocellulosic varnish. When applied onto a suitable support the so obtained solution yields a very intensive yellow coating which is fast to light and sublimation.

Example 6

The dyestuff obtained according to Example 1 is dispersed according to the method described in the Example 1 of the French Patent No. 858,386; one part by weight of the dispersed product is then pasted with 10 parts by volume of water and one adds 50 parts by weight of a thickener basically composed of gum. One prints on a tissue of mat cellulose acetate rayon silk, vaporizes, washes and dries. The printed parts are coloured in a greenish yellow which is bright and presents a good uniformity.

We claim:

1. As a new article of manufacture a textile material containing an organic derivative of cellulose of the group consisting of the esters and ethers of cellulose, colored with a dyestuff having the general formula:

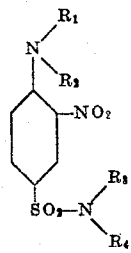

in which $R_1$, $R_2$, $R_3$, and $R_4$, represent respectively members of the group consisting of the hydrogen atom and the alkyl, hydroxyalkyl, cycloalkyl, aralkyl and aryl radicals, one at least of the radicals $R_1$, $R_2$, $R_3$, and $R_4$, being other than hydrogen.

2. As a new article of manufacture a fibrous textile material containing cellulose acetate fibers colored with the dyestuff having the following formula:

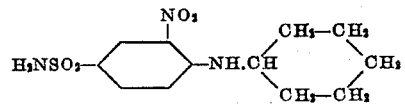

GEORGES KOPP.
RENÉ EUGÈNE MARCEL GANGNEUX.

REFERENCES CITED

The following references are of record in the file of this patent:

UNITED STATES PATENTS

| Number | Name | Date |
| --- | --- | --- |
| 2,019,627 | Olpin | Nov. 5, 1935 |
| 2,368,723 | Olpin | Feb. 6, 1945 |

FOREIGN PATENTS

| Number | Country | Date |
| --- | --- | --- |
| 814,422 | France | Mar. 15, 1937 |